March 2, 1926.
G. E. DYER
1,575,046
AUXILIARY LEVER ATTACHMENT FOR JACKS
Filed June 12, 1925
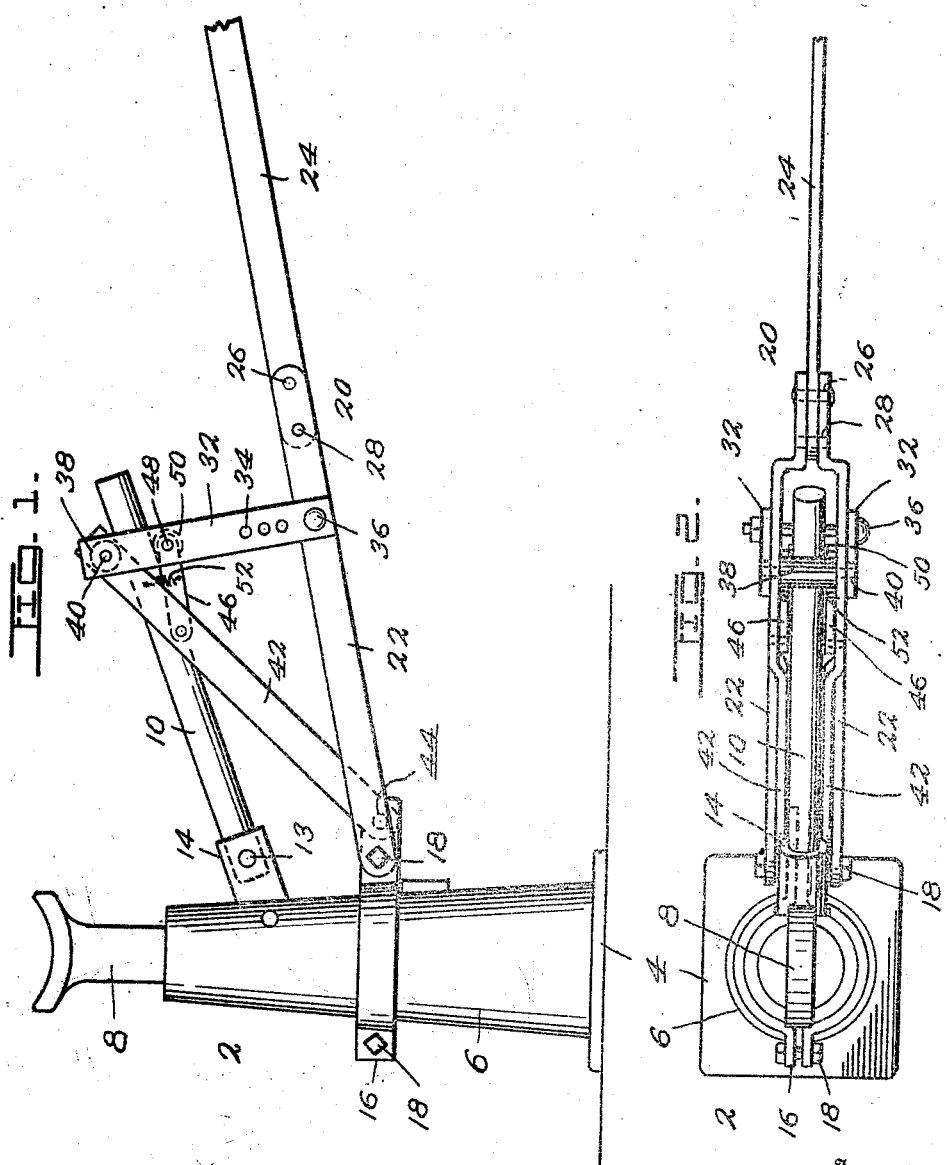
Witness:
Fred C. Fischer.
Inventor:
George E. Dyer,
By F. G. Fischer,
Attorney.

Patented Mar. 2, 1926.

1,575,046

UNITED STATES PATENT OFFICE.

GEORGE E. DYER, OF KANSAS CITY, MISSOURI.

AUXILIARY LEVER ATTACHMENT FOR JACKS.

Application filed June 12, 1925. Serial No. 36,700.

*To all whom it may concern:*

Be it known that I, GEORGE E. DYER, a citizen of the United States, residing at Kansas City, in the county of Jackson and State of Missouri, have invented certain new and useful Improvements in Auxiliary Lever Attachments for Jacks, of which the following is a specification.

My invention relates to lifting jacks of that class designed for placement beneath the axles of an automobile for the purpose of raising the same, and my object is to provide an auxiliary lever attachment whereby the jack may be placed in position beneath an axle and actuated to raise and lower the same without requiring the operator to assume an uncomfortable stooping or kneeling position.

A further object is to provide an attachment which may be compactly folded when not in use and carried in the tool box.

In order that the invention may be fully understood, reference will now be had to the accompanying drawing, in which:

Fig. 1 is a side elevation of a lifting jack equipped with the attachment.

Fig. 2 is a plan view thereof.

The lifting jack 2 may be of any ordinary construction embodying a base 4, a standard 6, and a lifting rack 8, which is actuated by the usual main lever 10 removably held by suitable means such as a bolt 13 in the socket 14 of any suitable lifting and holding means mounted in the standard 6.

Referring now more particularly to the attachment constituting the present invention, 16 designates a bracket consisting of two members firmly clamped to the standard 6 at a point below the socket 14 by suitable means such as bolts 18.

20 designates an auxiliary lever of suitable length and consisting of a pair of sections 22 and a section 24. The section 24 is connected to the sections 22 by a pivot 26 in order that it may be folded beneath said sections 22 when not in use. When the section 24 is extended for use it is secured in such extended position by the pivot 26 and a bolt 28. The pair of sections 22 are fulcrumed upon the bolt 18.

32 designates a pair of connecting bars having a plurality of holes 34, so that they may be adjustably connected to the lever sections 22 by a bolt 36. The connecting bars 32 extend upwardly from the lever sections 22 and are united at their upper ends by a spindle 40 upon which an antifriction roller 38 is mounted.

The connecting bars 32 are held at substantially right-angles to the lever sections 22 by a pair of links 42 connected to the spindle 38 and a pivot 44, which latter is secured to the bracket 16. The links 42 are provided at their upper portions with pivotally mounted arms 46 carrying a spindle 48 upon which an antifriction roller 50 is journaled. The roller 50 is yieldably held against the underside of the main lever 10 by coil springs 52 connected at their ends to the links 42 and the arms 46.

In practice the outer end of the lever 10 is arranged between the rollers 38 and 50, and the auxiliary lever 20 is extended as shown by Figs. 1 and 2. When thus extended the jack can be placed beneath the front or rear axle of an automobile and actuated to raise the same while the operator is in a standing position. As the auxiliary lever 20 is swung up and down on its fulcrum 18, it, through the intermediacy of the connecting bars 32 and rollers 38 and 50, moves the main lever 10 up and down. It is obvious that the main lever 10 could not be swung up and down an appreciable distance if the rollers 38 and 50 were fixedly held in contact therewith, owing to the oblique angle which said main lever 10 assumes to the connecting bars 32, but by yieldably mounting the roller 50 as hereinbefore described said main lever 10 may swing freely without being checked by said rollers 38 and 50. After the operator gets through with the jack the main lever 10 may be removed and the sections 22 swung upwardly adjacent to the rack 8 while the section 24 is folded against said sections 22 so that the jack may be packed away in a tool box.

From the foregoing description, taken in connection with the drawing, it is apparent that I have provided an attachment for lifting jacks embodying the advantages above pointed out, and while I have shown and described the preferred construction, combination and arrangement of parts, I reserve the right to make such changes and modifications as properly fall within the spirit and scope of the invention as claimed.

Having thus described my invention, what I claim and desire to secure by Letters Patent, is:

1. The combination with a lifting jack having actuating means including a main lever; of a bracket secured to the standard of said lifting jack, an auxiliary lever pivotally connected to said bracket, connecting bars extending upwardly from said auxiliary lever and operably connected to the main lever, and links pivotally connected to the upper portions of said connecting bars and the bracket.

2. The combination with a lifting jack having actuating means including a main lever, of a bracket secured to the standard of said lifting jack, an auxiliary lever pivotally connected to said bracket, connecting bars extending upwardly from said auxiliary lever and operably connected to the main lever, links pivotally connected to the upper portions of said connecting bars and the bracket, a roller engaging the upper surface of the main lever and mounted on the pivot connecting the links and the connecting bar, a roller engaging the underside of the main lever, a spindle on which said roller is journaled, a pair of arms carrying said spindle at one end and pivotally connected at their opposite end to the links, and spring means connecting said arms and the links to yieldably hold the last mentioned roller in engagement with the main lever.

In testimony whereof I affix my signature.

GEORGE E. DYER.